United States Patent [19]

Rupe

[11] Patent Number: 4,524,517
[45] Date of Patent: Jun. 25, 1985

[54] SANITARY TASTING SPOON

[76] Inventor: Iris A. Rupe, 3460 Eastside Calpella Rd., Ukiah, Calif. 95482

[21] Appl. No.: 499,196

[22] Filed: May 31, 1983

[51] Int. Cl.$^3$ .............................................. A47J 43/28
[52] U.S. Cl. ...................................................... 30/324
[58] Field of Search ................. 30/141, 150, 324, 325, 30/326, 327, 328; D7/50, 137

[56] References Cited

U.S. PATENT DOCUMENTS 1,688,079  4/1927  Hinz et al. ............................. 30/324
2,853,779  9/1958  Lordo ..................................... 30/150

FOREIGN PATENT DOCUMENTS 1013301  7/1952  France ................................. 30/326
1574164  6/1969  France ................................. 30/324

Primary Examiner—Paul A. Bell
Assistant Examiner—Paul M. Heyrana, Sr.
Attorney, Agent, or Firm—Limbach, Limbach & Sutton

[57] ABSTRACT

A spoon for the sanitary tasting of liquid food products characterized as having a bowl and handle is disclosed which is improved over prior art devices by providing a baffle located substantially within the bowl which is characterized as emanating from an inner side wall of the bowl and extending away from the bowl at an angle to a line of geometric centers of the spoon, and being further characterized as having an opening located proximate the edge of the baffle remote from the inner surface of the bowl.

4 Claims, 2 Drawing Figures

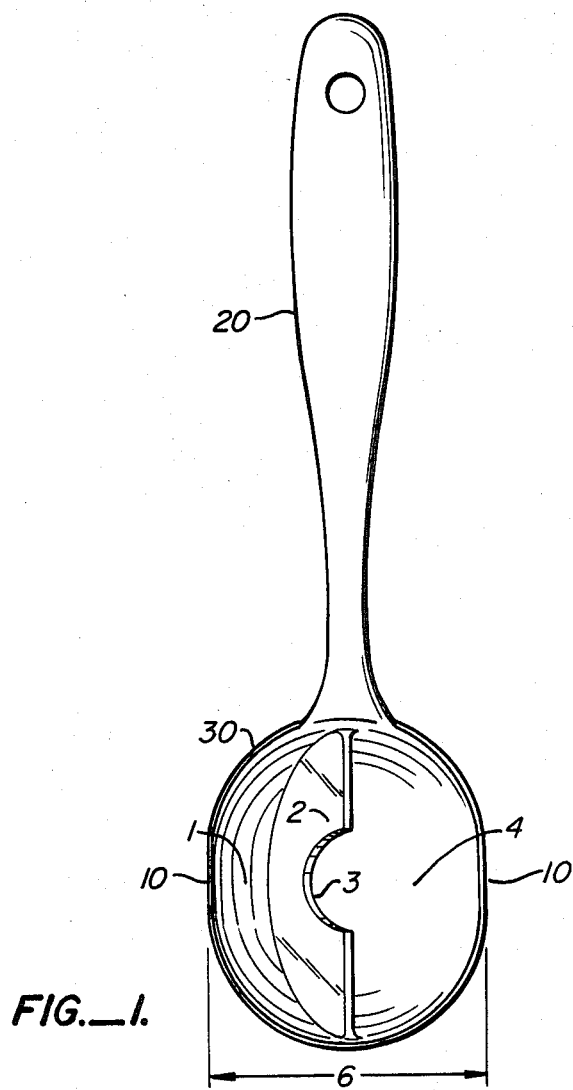
FIG.—1.
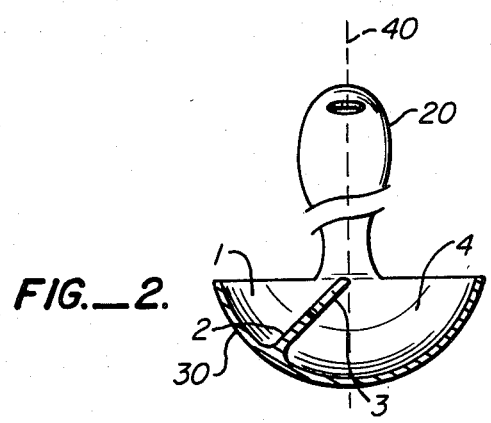
FIG.—2.

SANITARY TASTING SPOON

TECHNICAL FIELD

The present invention deals with a spoon or ladle device particularly adapted for use in testing liquid foods while maintaining a sanitary condition within the body of the food being tasted.

BACKGROUND OF THE INVENTION

As one would imagine, there have been a number of inventions concerning the design and use of various spoons and ladles. Considering the basic definition of such a product is merely a device having a bowl structure for receiving and holding materials such as liquid food products and a handle means connected thereto, it becomes quite evident that the number of modifications and improvements over the basic design are numerous and plentiful.

It has been determined, however, that no prior art spoon or ladle device has been designed whereby a liquid food product, such as soup, could be tasted by the preparer numerous times during the preparation of the food product while using the same spoon over and over again, without washing the same, while still maintaining the sanitary condition within the food. The reason for this is quite evident. When an ordinary spoon is dipped within the liquid food product and put to the lips of the taster, the spoon is then contaminated and introduces said contamination into the food product when a second tasting is carried out.

It is thus an object of the present invention to provide a spoon or ladle device which is improved over prior art devices.

It is yet another object of the present invention to provide a spoon or ladle device which is capable of being used to test liquid food products without contaminating the same and without having to wash the device between tastings.

These and further objects will be more fully appreciated when considering the following disclosure and appended drawings wherein:

FIG. 1 is a top plan view of the device of the present invention; and

FIG. 2 is a cross-sectional view taken along line 10—10 of FIG. 1.

SUMMARY OF THE INVENTION

In a spoon for the sanitary tasting of liquid food products having a bowl and handle connected thereto, the improvement comprising providing a baffle located substantially within the bowl and being characterized as emanating from an inner side wall of the bowl and extending away from the bowl at an angle to a line of geometric centers of the spoon and being further characterized as having an opening located proximate the edge of the baffle remote from the inner surface of the bowl.

DETAILED DESCRIPTION OF THE INVENTION

The spoon of the present invention can be characterized as possessing bowl 30 which, like virtually all other prior art spoon or ladle devices, is characterized as being a segment of a sphere, the circumference of which defines the curvature of said bowl. Connected thereto is handle 20 which can be designed in virtually any shape whatsoever for the comfort and convenience of the user.

The spoon device, having a line of geometric centers 40, is provided with baffle 2 which is characterized as emanating from the inner side wall of bowl 30 and extending away from the bowl at an angle to the line of geometric centers 40 of the spoon. Ideally, said baffle is configured to have an angle of 45° with said line of geometric centers.

The baffle 2 further possesses opening 3 located proximate the edge of the baffle remote from the inner surface of the bowl. It can be clearly seen that said baffle separates the area within the bowl into two portions 1 and 4, the purpose of which will now be described.

The use of the spoon or ladle device of the present invention is as follows. When the preparer of the liquid food product intends on taste-testing the same, the spoon is partially dipped within the liquid to trap some of the liquid only within area 4. Care is exercised that area 1 is not dipped within the liquid nor is area 4 filled to such an amount that a spill over naturally occurs into area 1.

Once the spoon is removed from the liquid, it is merely tilted along line of geometric centers 40 to transfer some of the liquid from area 4 to area 1 by spilling some of the liquid through opening 3. The taste tester can then sip the liquid from the edge of the spoon proximate area 1 without ever coming in contact with that portion of the spoon proximate area 4 or with any of the liquid trapped in area 4.

By practicing the above procedure, the liquid trapped in area 4 never comes in contact with the taster, nor does the portion of the bowl defined as area 4 become contaminated during the tasting process. As such, the spoon device can be repeatedly dipped within the liquid food product and the product taste-tested as recited above without contaminating the liquid food product and without need for washing the spoon between tastings.

What is claimed is:

1. In a spoon for the sanitary tasting of liquid food products having a bowl and handle connected thereto, the improvement comprising providing a baffle located substantially within the bowl and being characterized as emanating from an inner side wall of the bowl and extending away from the bowl at an angle to a line of geometric centers of the spoon and being further characterized as having an opening located proximate the edge of the baffle remote from the inner surface of the bowl.

2. The spoon of claim 1 wherein said baffle is at a 45° angle to the line of geometric centers of the spoon.

3. The spoon of claim 1 wherein said opening comprises a half circle removed from the baffle.

4. The spoon of claim 1 wherein the baffle and opening are configured such that liquid can be caused to accummulate at the bottom of the bowl and transferred through the opening in the baffle without the transferred liquid returning to the bottom of the bowl.

* * * * *